Nov. 24, 1936.  E. PAPPERT ET AL  2,061,847

OPTICAL MOUNTING

Filed June 26, 1935

INVENTORS
Emanuel Pappert
Henry M. Smith
BY
Harry Jacobsen
ATTORNEY.

Patented Nov. 24, 1936

2,061,847

UNITED STATES PATENT OFFICE 2,061,847

OPTICAL MOUNTING

Emanuel Pappert, New York, and Henry M. Smith, Garden City, N. Y.; said Smith assignor to T. & P. Optical Co., New York, N. Y., a corporation of New York Application June 26, 1935, Serial No. 28,424

4 Claims. (Cl. 88—43)

This invention relates to optical mountings and particularly to the means for securing a metallic bridge to non-metallic lens frames.

Our invention contemplates the provision of a metal mounting on a softer non-metallic or composition lens frame, which mounting puts little or no strain or stress upon the composition lens frames, such as would tend to break or loosen the parts. Our invention further contemplates the provision of a mounting utilizing a rigid fastening means which is concealed from view and which is durable and efficient throughout the entire life of the remaining parts of the spectacles, and which can be secured effectively to lens frames of different thicknesses.

Our invention further contemplates the provision of fastening means to secure a metallic bridge to a non-metallic lens frame, said means permitting the quick and easy removal of the bridge and the substitution of a similar bridge of different form, shape, color or ornamentation to suit the particular fancy of the user, and also permitting the easy and rapid removal of the nose pads, where such is used, when it is desired to replace or repair said pads.

Our invention further contemplates the provision of strong and durable fastening means not likely to become loosened to secure a metallic bridge to composition lens frames in such a manner as to avoid weakening of the lens frames and to distribute the stress, resulting from bending or using the spectacles, over the surfaces of the lens frames instead of stressing the interior thereof.

The various objects of our invention will be clear from the description which follows, and from the drawing, in which Fig. 1 is a rear view of a pair of spectacles embodying our invention.

Figure 2:
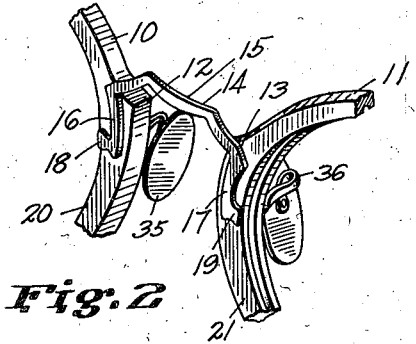
Fig. 2 is a perspective view of our improved mounting showing the bridge and portions of the composition lens frames to which the bridge and suitable nose guards are secured.

In the practical embodiment of our invention which we have shown by way of example, the lens frames 10 and 11 are made of non-metallic material such as nitro-cellulose or other composition softer and lighter and more easily workable than metal and such as is frequently used for the lens frames of spectacles. Each of the lens frames is preferably, though not necessarily, widened at its inner side as at 12 and 13 to provide an adequate bearing area for our improved mountings and to provide sufficient material at which may be arranged the fastening elements for securing the bridge 14 in place. Said bridge 14 is made of metal and comprises the cross member 15 and the depending arms 16, 17. At their lower ends, each of the arms may be somewhat widened as at 18, 19 for the purpose later to be described.

The arms 16 and 17 rest against the front face 20, 21 of the respective lens frames 10 and 11, and have front surfaces continuous with the remaining front surface of the bridge and free of screws or other mutilating or projecting fastening means. Projecting rearwardly, however, from the rear face 22 of each of said arms 16 and 17, is a pair of vertically spaced tubular members 23 and 24. Said tubular members may be formed integrally with each of said arms, or they may be made in the form of tubes soldered at their front ends to the rear faces 22 of said arms. The widened parts 18 and 19 of the arms provide a sufficient area to accommodate the ends of the tubes. Such soldering makes a strong joint between the tubes and the bridge, the solder engaging not only the outer surface of the tube but the inner surface as well, and being thus held on a comparatively large area. Each of the tubes is preferably of less length than the thickness of the lens frame whereby the tube does not extend completely through the lens frame when inserted into the openings 25, 26 of said lens frames into which openings the tubes are snugly but not forcibly fitted. Because the tubes are insufficiently long to project through the lens frame, they may be used on frames differing considerably in thickness and need not therefore be made of any definite length.

Figure 3:
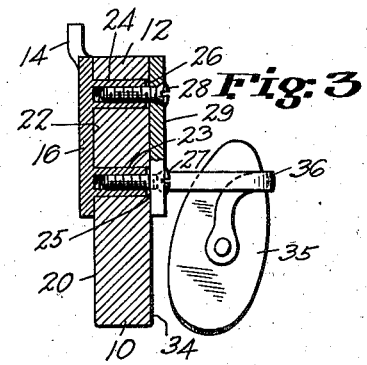
Fig. 3 is a vertical section of the same.
Figure 1:
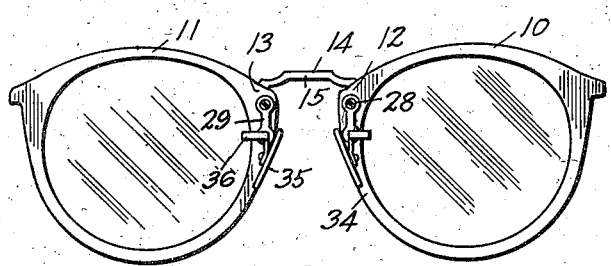
Figure 4:
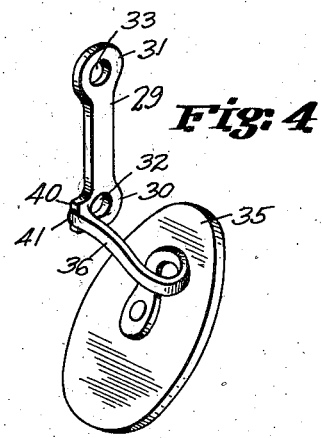
Fig. 4 is a perspective view of the nose guard and its integral rear fastening member.

Each of the tubes is internally threaded for the reception of suitable screws such as 27, 28. To prevent any tendency of the tubes from putting undue pressure on the walls of the openings in which they are inserted, which pressure might tend to ultimately exert a breaking stress upon the lens frame, a suitable bearing surface is provided for the heads of the screws 27, 28. Said bearing surface, as shown in Figs. 1, 3 and 4, takes the form of the plate or washer 29 preferably enlarged at each end as at 30, 31 and there perforated with suitable screw-receiving openings as 32, 33 respectively.

The openings may be countersunk as desired for the reception of the screw head.

It will be understood that the bridge having been arranged with its legs 16, 17 on the front faces of the lens frame, and the plates 29 on the rear faces thereof, when the shank of the screw 27 is passed, for example, through the opening 32, it enters the tube 23 and when rotated, engages the internal threads thereof whereby the plate 29 is tightened against the rear face 34 of the lens frame and at the same time the rear face 22 of the bridge is tightened against the front faces 20 and 21 of the lens frames. The pressure exerted by the screw, therefore, is not transmitted in any way to the walls of the openings 25 or 26 but instead, is transmitted to the faces of the lens frames to make a strong, firm and durable connection, which while readily separable by the removal of the screws, does not tend to become loose.

An adequate bearing is provided by the bridge and by the plate 29 to properly distribute the stresses caused by use of the spectacles over the faces of the lens frames whereby breakage of said frames under the stresses of use cannot occur.

To replace the bridge 14 with another, the screws 27, 28 are removed whereby the tubes 23, 24 may be readily withdrawn from their openings and a different bridge provided with similar tubes similarly spaced may be similarly secured to the lens frames.

As shown in Figs. 1, 3 and 4, to the plate 29 is secured the nose pad 35 as by means of the bendable wire adjusting member 36 which may be made integral with or soldered to the plate 29. When soldered, a suitable recess is formed in the edge 40 of the somewhat widened lower end of the plate, the end 41 of the member 36 being arranged and soldered into the recess.

Figures 5, 6:
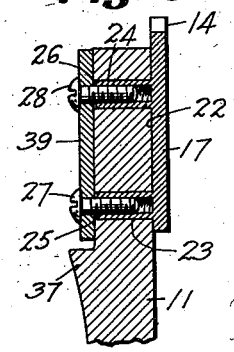
Fig. 5 is a rear elevation of a portion of the bridge and of the lens frame showing our invention applied to a composition frame having an integral nose guard.
Fig. 6 is a vertical section of the same, taken on the line 6—6 of Fig. 5.

As shown, however, in Figs. 5 and 6, the nose guard 37 is made integral with or permanently secured to the lens frame 11 and is therefore preferably made of the same composition or other non-metallic material from which the lens frame is made. In this form of our invention, a plate or washer as 39 is arranged on each of the rear faces of the lens frames and is perforated similarly to the plate 29 for the passage of the fastening screws.

It will be seen that we have provided a mounting wherein an internally threaded metallic tube projecting from the rear face of the bridge is snugly inserted into a suitable opening in a non-metallic lens frame and is held in place by means of a metallic screw having a bearing against a metallic plate arranged on the opposite face of the lens frame and engaging the internal threads of the tube.

It will further be seen that by reason of the construction described, the stresses and strains put upon a non-metallic lens frame by the means heretofore used to secure the bridge and nose pad to the non-metallic frame are avoided, and that we have produced a rigid structure which while permitting quick and easy assembly and removal and substitution of the bridge and nose pads, is nevertheless possessed of great durability and is well adapted to meet the severe requirements of practical use.

While we have shown and described certain specific embodiments of our invention, we do not wish to be understood as limiting ourselves thereto but desire to claim our invention as broadly as may be permitted by the state of the prior art and the scope of the appended claims.

We claim:

1. In an optical mounting, a pair of separate non-metallic lens frames each having a widened portion at its inner upper part provided with a pair of spaced perforations, said widened portion being flat on its front and rear faces, a one-piece metallic bridge having a pair of depending legs each having a comparatively wide uninterrupted and imperforate flat face adapted for intimate contact with the flat front surface of the widened portion of the lens frame, a pair of spaced internally threaded tubes permanently secured to and projecting from the rear face of each of the legs and passing laterally into the frame toward the rear face thereof, a rear member having a wide flat face adapted for intimate contact with the flat rear face of the widened portion of the lens frame, and having a pair of spaced perforations aligned with the perforations of said widened portion, and a screw passing through each of the perforations of the rear member and into threaded engagement with one of the tubes for removably securing the bridge and said members together with the frame therebetween, and also securing the lens frames together.

2. In an eye glass frame, a pair of non-metallic lens frames, each of said frames being widened at an inner upper edge part thereof, a one-piece metallic bridge having a pair of depending legs and a cross bar integral with and joining the legs, a widened part at the free end of each of the legs, a first internally threaded tube projecting from the rear face of each of the legs of the bridge adjacent the widened part thereof, a second similar tube projecting from the rear face of the leg and in spaced relation to the first tube, said tubes passing through perforations in the widened part of the lens frames, a plate arranged on the rear face of each of the lens frames and at the widened part thereof, said plate being provided with a pair of spaced perforations, an externally threaded screw passing through each of the perforations of the plate and into the perforation of the lens frame and in threaded engagement with a tube to carry the plate and the bridge into intimate contact with the rear and with the front faces of the lens frame respectively, and adapted when removed to free the plate and the bridge for removal from the lens frame, said plate being provided with an edge recess, an adjustable metallic member having one end arranged in the recess and soldered to the plate, and a nose pad carried by the other end of said metallic member.

3. In an eye glass frame, a metallic bridge having a pair of depending legs having spaced widened portions, a continuous, uninterrupted non-metallic lens frame having a widened inner upper part at one of the legs of the bridge provided with a pair of spaced perforations, a pair of spaced internally threaded tubes secured to and projecting from the rear face of the widened portions of the legs of the bridge and through the perforations in the widened part of the lens frame and of less length than the thickness of the lens frame, a flat metallic member arranged at the rear face of the widened part of the lens frame and having widened perforated parts, and a pair of screws passing through the perforations of the widened parts of the metallic member and into the tubes and securing the rear face of the bridge and the rear face of the member in intimate contact respectively with the front and rear faces of the lens frame.

4. In an eye glass frame, a pair of separate continuous and uninterrupted lens frames, each of said frames being widened at an inner upper edge part thereof, said widened part having a pair of spaced perforations therein, a metallic bridge having a pair of depending legs, a pair of spaced widened parts on each of the legs, an internally threaded tube projecting from the rear face of each of the widened parts of the legs and passing through one of said perforations, a plate on the rear face of the widened part of the frame and having a pair of spaced perforations therein aligned with the perforations of the widened part of the frame, an externally threaded screw passing through each of the perforations of the plate and into the aligned perforation of the frame and in threaded engagement with a tube, an adjustable metallic member soldered at one end to the plate, and a nose pad carried by the other end of the adjustable member.

EMANUEL PAPPERT.
HENRY M. SMITH.